(12) United States Patent
Cork

(10) Patent No.: US 8,071,033 B2
(45) Date of Patent: Dec. 6, 2011

(54) HORIZONTAL FLUIDISED BED REACTOR

(75) Inventor: David Cork, Medowie (AU)

(73) Assignee: Corky's Carbon and Combustion Pty Ltd. (AU)

( * ) Notice: Subject to any disclaimer, the term of this patent is extended or adjusted under 35 U.S.C. 154(b) by 258 days.

(21) Appl. No.: 12/227,814

(22) PCT Filed: May 24, 2007

(86) PCT No.: PCT/AU2007/000718
§ 371 (c)(1),
(2), (4) Date: May 20, 2009

(87) PCT Pub. No.: WO2007/137330
PCT Pub. Date: Dec. 6, 2007

(65) Prior Publication Data
US 2009/0238730 A1    Sep. 24, 2009

(30) Foreign Application Priority Data
May 26, 2006 (AU) ................................ 2006902837

(51) Int. Cl.
*B01J 8/36* (2006.01)
*C10B 57/10* (2006.01)

(52) U.S. Cl. ........................................................ 422/139

(58) Field of Classification Search .................... 422/139
See application file for complete search history.

(56) References Cited

U.S. PATENT DOCUMENTS

| | | | |
|---|---|---|---|
| 3,585,732 A * | 6/1971 | Itahashi | 34/578 |
| 3,921,307 A * | 11/1975 | Marek et al. | 34/363 |
| 5,087,269 A | 2/1992 | Cha et al. | |
| 5,169,913 A * | 12/1992 | Staffin et al. | 526/65 |
| 5,198,029 A * | 3/1993 | Dutta et al. | 118/303 |
| 5,264,196 A * | 11/1993 | Tanaka et al. | 423/258 |
| 5,378,434 A * | 1/1995 | Staffin et al. | 422/141 |
| 5,568,834 A * | 10/1996 | Korenberg | 165/104.16 |
| 6,559,087 B1 | 5/2003 | De Lange et al. | |
| 2004/0156750 A1 * | 8/2004 | Stichert et al. | 422/99 |

FOREIGN PATENT DOCUMENTS

| | | |
|---|---|---|
| GB | 2006942 A | 5/1979 |
| GB | 1592847 A | 7/1981 |
| JP | 09-255968 A | 9/1997 |
| JP | 11-083319 A | 3/1999 |
| SU | 479940 A | 11/1975 |
| WO | WO 00/21654 A | 4/2000 |

* cited by examiner

*Primary Examiner* — Walter Griffin
*Assistant Examiner* — Huy-Tram Nguyen
(74) *Attorney, Agent, or Firm* — Morris O'Bryant Compagni

(57) ABSTRACT

A reactor for contacting a fluid with a granular solid, the reactor including: a reactor housing including a reaction zone in which the fluid and the granular solid are contacted together; a granular solids inlet adapted to deliver a bed of granular solids into the reaction zone wherein the height and/or width dimension of the bed of the granular solids is substantially less than the length of the bed; a plurality of fluid inlets for delivering the fluid into the reaction zone, whereby the delivery of the fluid into the reaction zone at least partially fluidises the bed of granular solids; a granular solids outlet for receiving the bed of granular solids after having passed through the reaction zone; and, a fluid outlet for receiving the fluid, and any entrained particles, after the fluid has passed through the reaction zone.

17 Claims, 5 Drawing Sheets

HORIZONTAL FLUIDISED BED REACTOR

The present invention relates to a reactor for contacting a fluid with a granular solid and in particular a reactor where the granular solid is at least partially fluidised.

BACKGROUND OF THE INVENTION

The term "fluidised bed" is used to describe reactors with reaction zones where a fluid is passed through a bed of granular particles such that the granular particles move to some degree. The degree of solids movement leads to various categories of fluidised bed reactors including:
  incipient (solids rolling but with little vertical or lateral movement)
  bubbling or partial fluidised or slugging fluidised
  fully fluidised Fluidised beds are typically used to transfer heat or mass between a fluid process stream and a solid process stream. For such applications, fluidised beds are very effective, however they are typically an expensive option due to the large cost of the equipment involved such as the requirement of large fans, complicated ducting underneath the bed, and complexity in design.

Fluidised beds are used for various applications including gas scrubbing, drying of solids, pyrolysis, gasification, calcining, catalytic reactions, catalysis cleaning and/or combustion of solids. Processes in which solids are contacted with a hot gas, such as drying, often result in decrepitation of the solids where they crack and break into smaller particles. Such decrepitation of the solids results in an excessive amount of fine particles being produced which are unable to be used and form a waste product.

Accordingly, the present invention seeks to provide a reactor for contacting a fluid with a solid that is relatively inexpensive compared to typical fluidised bed reactors whilst maintaining rates of heat and/or mass transfer. The present invention also seeks to provide a reactor for contacting a fluid with a solid that reduces any decrepitation of the solid being contacted with the fluid.

SUMMARY OF THE INVENTION

According to one aspect the present invention provides a reactor for contacting a fluid with a granular solid, the reactor including:
  a reactor housing including a reaction zone in which the fluid and the granular solid are contacted together;
  a granular solids inlet adapted to deliver a bed of granular solids into the reaction zone wherein the height and/or width dimension of the bed of the granular solids is substantially less than the length of the bed;
  a plurality of fluid inlets for delivering the fluid into the reaction zone, whereby the delivery of the fluid into the reaction zone at least partially fluidises the bed of granular solids;
  a granular solids outlet for receiving the bed of granular solids after having passed through the reaction zone; and,
  a fluid outlet for receiving the fluid, and any entrained particles, after the fluid has passed through the reaction zone.

The reaction zone may include chemical and/or physical reactions resulting from contacting the fluid with the granular solid.

Preferably, the reactor is used in a continuos process of contacting a fluid with a granular solid whereby the granular solids inlet is adapted to deliver a continuous bed of granular solids into the reaction zone.

Preferably, the bed of granular solids passes through the reaction zone from the granular solids inlet to the granular solids outlet at a declining angle to the horizontal whereby gravity assists in the movement of the bed of granular solids from the solids inlet to the solids outlet. According to this preferred aspect of the present invention, the granular solids inlet is at a higher position relative to the granular solids outlet. Preferably, the angle of declination from the granular solids outlet to the granular solids outlet is 3° to 15° and more preferably 5° to 10°.

Preferably, the plurality of inlets delivers the fluid into the reaction zone at positions along the length dimension of the bed of granular solids. Preferably, the plurality of inlets for delivering fluid into the reaction zone are diagonally opposed along the length dimension of the bed of granular solids and/or do not encroach, or substantially encroach, into the bed of granular solids. In another preferred form the plurality of inlets is arranged at an angle to the bed of granular solids to facilitate movement of the bed of granular solids through the reaction zone.

Preferably, the height dimension of the bed of granular solids is substantially less than compared to the length of the bed. Preferably the length of the bed is substantially greater than the width.

Preferably the delivery of the fluid into the reaction zone differentially fluidises the bed of granular solids wherein the bed of granular solids does not substantially segregate.

Preferably, as the bed of granular solids moves through the reaction zone the reaction zone includes high contact zones where the granular solid is in contact with the fluid and is granular solid in the contact zone is substantially fluidised and low contact zones whereby the contact of the fluid with the granular solid is substantially reduced and the granular solid is substantially unfluidised or not fluidised. According to this aspect, the location of the high contact zones within the reaction zone is adjacent the plurality of fluid inlets.

The reactor of the present invention may be arranged whereby the fluid and the granular solids are contacted in a co-current configuration, a counter-current configuration or a cross-current configuration.

Preferably, the reactor may be arranged with one or more further reactors to form a series of reactors. Such a series of reactors can provide an increase in the heat and/or mass transfer between the fluid and the granular solid to suit specific demands from various applications.

The reactor may be used to contact a fluid with a granular solid for the various purposes including gas scrubbing, drying of solids, pyrolysis, gasification, calcining, catalytic reactions, catalysis cleaning, cooling, mass transfer and/or combustion.

BRIEF DESCRIPTION OF THE DRAWINGS

The present invention will become better understood from the following detailed description of a preferred but non-limiting embodiment thereof, described in connection with the accompanying drawings, wherein.

DETAILED DESCRIPTION OF THE DRAWINGS

Referring to the embodiments of the present invention detailed in the figures the complexity of a traditional fluidised bed has been reduced significantly lowering the inherent cost of producing and operating the reactor. The bed height and/or width has been reduced to lower the cost of the fan required, gravity is used to assist the movement of the granular solids through the reaction zone and any pipe work for the fluid stream has been moved to the outside of the bed. Furthermore, the fluidised bed reactors of the present invention can tolerate a larger top size and wider size distribution compared to traditional fluidised beds with fines automatically classified out of the system. This significantly reduces feed preparation costs. In addition, the decrepitation of particles is reduced in the current invention by having high contact and low contact zones between the fluid and granular solid.

Figure 1:
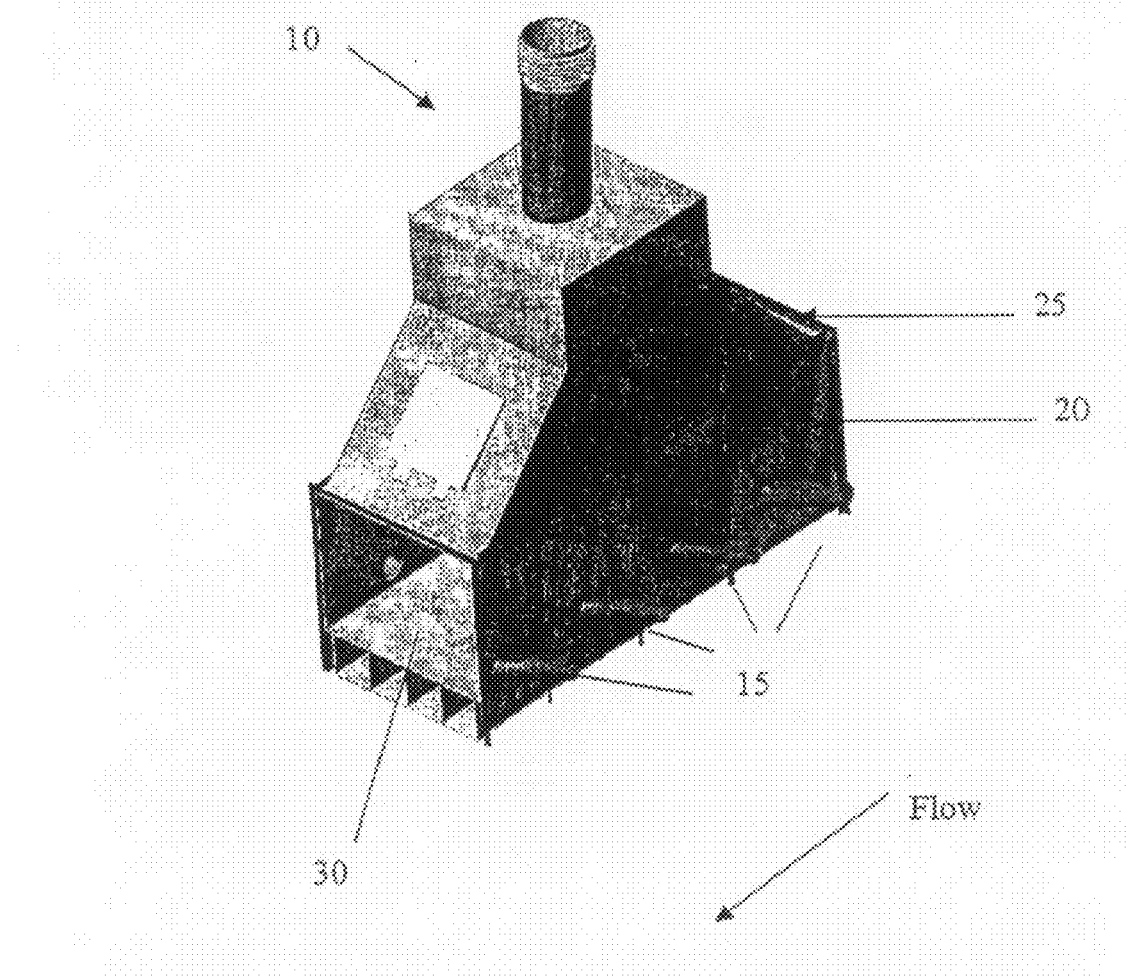
FIG. 1 illustrates a schematic diagram of a reactor in accordance with one aspect of the present invention.

Referring to FIG. 1, there is shown a single modular reactor 10 including a plurality of diagonally opposed fluid inlets (or tuyeres) 15 through which enough fluid is blown/pumped to partially, or differentially, fluidise the granular solids moving as a bed through a reaction zone inside the main body portion of the reactor 10. The fluid inlets 15 introduce the fluid into the bed of granular solids but the inlet pipes do not enter the physicality of the bed itself. Thus there is typically no sparge pipe in the bed to delivery fluid to the bed. In this embodiment this feature provides a significant advantage when drying or reacting abrasive material. However, the present invention also embodies the arrangement wherein the sparge pipe leading from the fluid inlet can enter the bed by a short distance, such as 1 to 3 diameters of the sparge pipe (or fluid inlet) in length, to improve bed mixing if required when the bed material is not particularly abrasive.

In addition, the fluid inlets 15 in this embodiment are introduced at an angle to the bed to facilitate movement of the bed through the reaction zone. In this configuration, the fluid and granular solids are contacted in a cross-current manner.

The inlet for the granular solids 25 is located at a position higher than the outlet 30 whereby the angle of the bed moving through the reaction zone is at a decline relative to the horizontal. In this configuration, gravity also assists in shuffling the bed of granular solids moving through the reaction zone of the reactor 10.

The bed moving through the reaction zone of the reactor 10 is said to be horizontally fluidised because the bed height is low compared to the width and length of the bed. Thus there is a low-pressure drop across this bed compared to a conventional fluidised bed reactor, thus requiring reduced fan capacity and thereby lowering the capital and running costs of the reactor 10. The length of the bed is also much longer than the width. This also has the effect of reducing the support structure of the present invention although the footprint may be larger than currently known technology.

The bed is said to be differentially fluidised as the degree of fluidisation is uneven across the bed. In this form, the solids do not segregate as is the case in a conventional fluidised bed reactor.

The arrangement of inlets 15 entering the bed from the side of the bed can be used with vertical spouts to increase bed width has required or to accommodate boiler or ash cones.

In addition to the fluid inlets, the reactor of the present invention may also include non-contact heat exchange between the granular solids and another fluid that is within a pipe or other non contact heat exchange configuration. Typically, pipes are introduced vertically through the bed and would include a heating fluid such as steam in order to provide a further heating source to the reaction zone. Alternatively, if cooling was required, then a cooling fluid such as water may be used to reduce the heat in the reaction zone.

Figure 2:
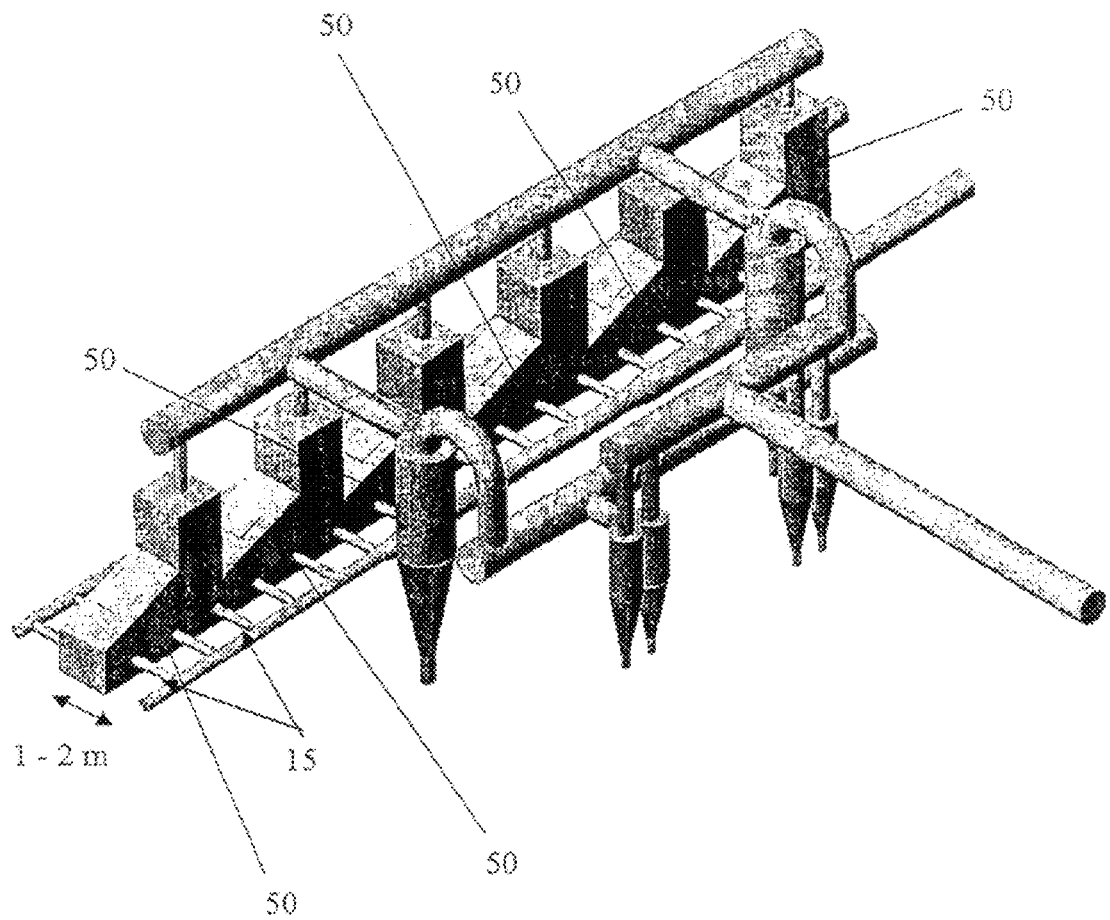
FIG. 2 illustrates a schematic diagram of a series of reactors in accordance with one aspect of the present invention.

Referring now to FIG. 2 there is shown a series of 6 reactors 50 in accordance with another embodiment of the present invention. The modular nature of the reactors of the present invention means that if extra heat transfer is required for a particular application there is no scale up risk. For example if a single module has a heat transfer of 0.8 MW then 5 modules will have a heat transfer of 4.0 MW.

Figure 3:
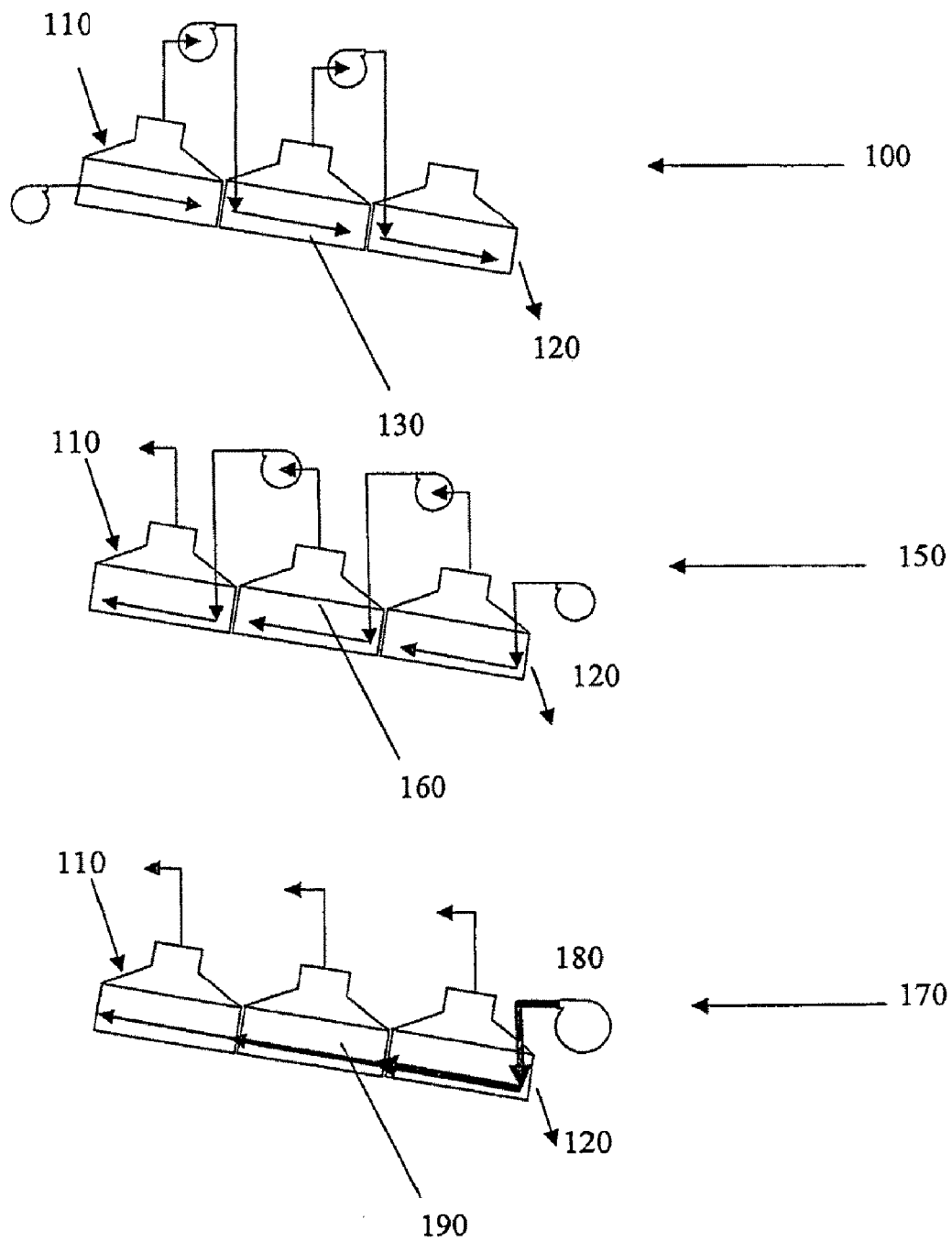
FIG. 3 illustrates three configurations for a series of reactors in accordance with another aspect of the present invention.

Referring now to FIG. 3 there is shown three configurations of three reactors in series. In the first configuration 100, the solids are introduced through the granular solids inlet 110 at a point significantly higher than the granular solids outlet 120. This provides that the force of gravity assists the bed of granular solids moving through the series of reactors 100. Furthermore, in this configuration the fluid is introduced in a co-current configuration such that the velocity of the fluid, in addition to partially fluidising the solids in the reaction zone 130, also assists in the movement of the bed of granular solids as it passes through the reaction zone 130.

In the second configuration 150, the granular solids are introduced into the reactor in the same manner, however the fluid is introduced in a counter-current configuration such that the path of the fluid is opposed to that of the bed of granular solids moving through the series of reactors 150.

Finally in the third configuration 170 the fluid inlet 180 is arranged in a manner whereby it is introduced into the reaction zone in a direction that is perpendicular to that of the bed of granular solids moving through the reaction zone 190. Such various configurations increase the versatility of the present invention and widen the potential applications that the present invention may be used for.

The present invention will become better understood from the following examples of preferred but non-limiting embodiments thereof.

The following examples are of an integrated coal dryer, carboniser and char cooler made from individual or series of reactors according to various aspects of the present invention.

Example 1

Coal Dryer

Forty nine tonne per hour of crushed coal (100%-15 nm) at 28% moisture is dried in a 16.5 m long five cell fluidised bed dryer in about 9 to 10 minutes. The dryer is heated via a 10 MW burner. The burner produces approximately 28500 kg/h of 800° C. waste gas containing 1.6% (M/M) oxygen and 25000 kg/h of 800° C. air. The last cell of the dryer is heated by the off gas from the carboniser.

Figure 4:
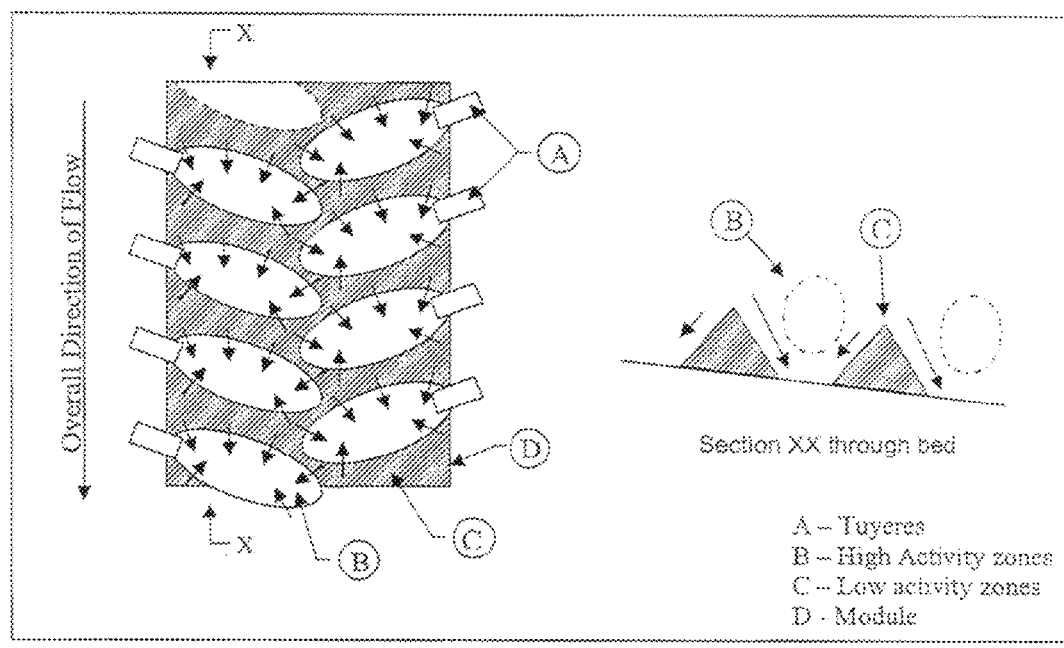
FIG. 4 is a schematic diagram of the interior of the reaction zone of a reactor in accordance with one aspect of the present invention; and, FIG. 5 is a chart graphically depicting the behaviour of crushed coal in accordance with an example embodiment of the present invention.

Coal enters the dryer via a series of rotary valves and moves east, north-east down the dryer. The dryer is differentially fluidised. Each cell has four tuyeres down each side through which hot inert gas is blown. This means that there is 40 zones where there is high contact activity separated by 40 zones where there is low contact activity. See FIG. 4.

In the high contact activity areas, the moisture close to the coal particle surface is flashed off and the coal is fully fluidised. The coal particle is cooled by the evaporating moisture. There is a larger average distance between coal particles. There are high rates of heat and mass transfer in these zones.

In the low contact activity areas, the coal particle is allowed to recover from the thermal shock of the high activity zones.

The moisture deep inside the coal particle moves to the outside of the coal. The large and small coal particles remix. The smaller, hot particles assist the drying of the bigger and cooler coal particles. The coal particles exhibit a rolling, sliding motion and are packed relatively close together. This zone is important in that it reduces the formation of coal fines compared to the continuous application of heat.

The coal moving from high contact and low contact activity zones has the effect of significantly reducing the decrepitation of the coal moving through the reactor as compared to a process where there is a continues application of heat to the coal.

Figure 5:
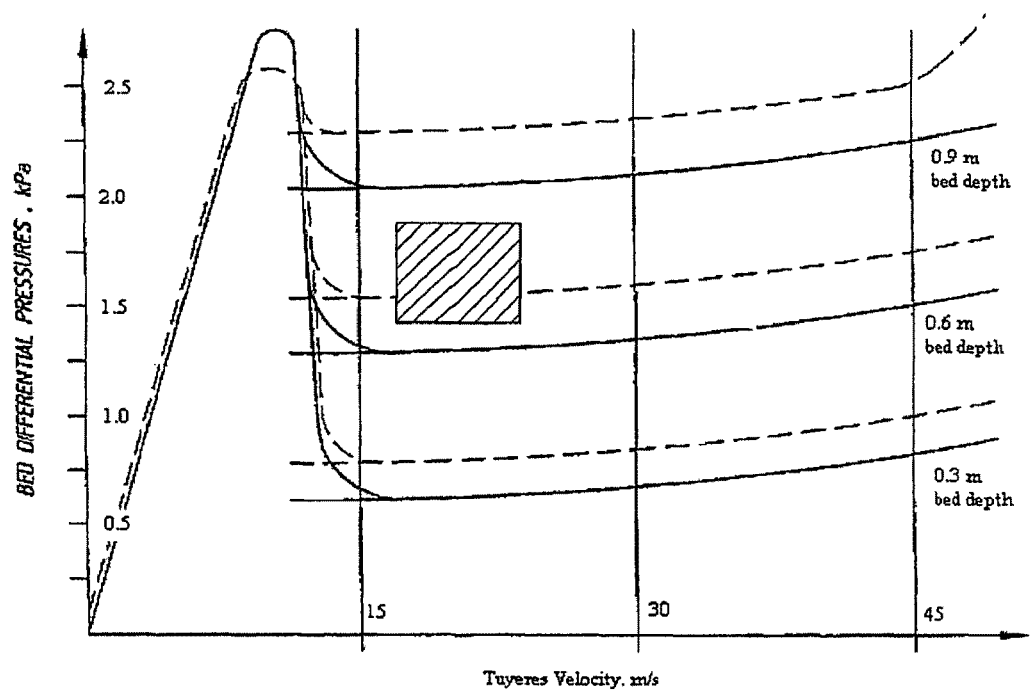

The bottom of the dryer is refractory lined and the entire body insulated with mineral fibre that is encapsulated in an outer metal skin. The dryer hot fluidising gas is provided by two 90 kW belt driven hot gas fans with a third 90 kW fan sucking the cool wet gas out of the dryer. The total pressure drop across the dryer is 4 kPa during start-up and 3 kPa during normal operations. Refer to FIG. 5.

Example 2

Coal Carboniser

The dryer feeds 150° C. dry coal to the 13.2 m long refractory lined carboniser via a gas lock feeder. The coal is carbonised to 1300° C. Hot air at 800° C. is feed to the carboniser which combusts with some of the coal gas. The coal gas flows counter current to the coal/char flow. The total residence time above 900° C. is between 11 and 12 minutes. Approximately 24500 kg/h of dry char is produced. Excess coal gas and combustion gases are collected.

Example 3

Char Cooler

The carboniser feeds three 9.9 m long refractory lined coolers which drop the char temperature from 1300° C. to less than 500° C. These coolers are feed counter current with cool inert gas. The refractory cooler then feed a further six steel refractory coolers. This reduced the gas temperature to below 70° C. The char moisture is raised to 6% to suppress dust.

This carbonising system has a nominal capacity of 190000 tpa of 6% moisture, 2% volatile char.

Finally, it can be understood that the inventive concept in any of its aspects can be incorporated in many different constructions so that generality of the preceding description is not superseded by the particularity of the attached drawings. Various alterations, modifications and/or additions may be incorporated into the various constructions and arrangements of parts without departing from the spirit or ambit of the present invention.

The invention claimed is:

1. A reactor for contacting a fluid with a granular solid, the reactor including:
   a reactor housing including a reaction zone in which the fluid and the granular solid are contacted together;
   a granular solids inlet adapted to deliver a bed of granular solids into the reaction zone wherein the height and/or width dimension of the bed of the granular solids is less than the length of the bed;
   a plurality of fluid inlets for delivering the fluid into the reaction zone from the side of the bed, whereby the delivery of the fluid into the reaction zone at least partially fluidises the bed of granular solids;
   a granular solids outlet for receiving the bed of granular solids after having passed through the reaction zone; and,
   a fluid outlet for receiving the fluid, and any entrained particles, after the fluid has passed through the reaction zone,
   wherein the plurality of inlets for delivering fluid do not encroach into the bed of granular solids.

2. A reactor according to claim 1 wherein the granular solids inlet is adapted to deliver a continuous bed of granular solids into the reaction zone whereby the reactor operates in a continuous process.

3. A reactor according to claim 1 wherein the bed of granular solids passes through the reaction zone from the granular solids inlet to the granular solids outlet at a declining angle to the horizontal whereby gravity assists in the movement of the bed of granular solids from the solids inlet to the solids outlet.

4. A reactor according to claim 3 wherein the declining angle to the horizontal is 3° to 15°.

5. A reactor according to claim 1 wherein the plurality of inlets delivers the fluid into the reaction zone at positions along the length dimension of the bed of granular solids.

6. A reactor according to claim 5 wherein the plurality of inlets for delivering fluid into the reaction zone are diagonally opposed along the length dimension of the bed of granular solids.

7. A reactor according to claim 1 wherein the plurality of inlets is arranged at an angle to the bed of granular solids to facilitate movement of the bed of granular solids through the reaction zone.

8. A reactor according to claim 1 wherein the height dimension of the bed of granular solids is less than the length dimension of the bed.

9. A reactor according to claim 1 wherein the length dimension of the bed is greater than the width dimension.

10. A reactor according to claim 1 wherein the delivery of the fluid into the reaction zone differentially fluidises the bed of granular solids wherein the bed of granular solids does not substantially segregate.

11. A reactor according to claim 1 wherein the reaction zone includes high contact zones, where the granular solid is in contact with the fluid and is substantially fluidised, and low contact zones where the contact of the fluid with the granular solid is substantially reduced and the granular solid is substantially unfluidised or not fluidised.

12. A reactor according to claim 11 wherein the location of the high contact zones within the reaction zone is adjacent the plurality of fluid inlets.

13. A reactor according to claim 1 wherein the reaction zone includes chemical and/or physical reactions.

14. A reactor according to claim 1 wherein the fluid and the granular solids are contacted in a co-current configuration, a counter-current configuration or a cross-current configuration.

15. A reactor according to claim 1 wherein the reactor is arranged with one or more further reactors to form a series of reactors.

16. A reactor according to claim 1 wherein the reactor is used to contact a fluid with a granular solid for a process chosen from: gas scrubbing, drying of solids, pyrolysis, gasification, calcining, catalytic reactions, catalysis cleaning, cooling, mass transfer and/or combustion.

17. A reactor according to claim 1 wherein the reactor is used for the purposes of drying coal.

* * * * *